(12) United States Patent
Bishop

(10) Patent No.: US 7,611,356 B1
(45) Date of Patent: Nov. 3, 2009

(54) TRAINING DEVICE FOR SIMULATING THE RESPONSE OF A LOCKED DOOR TO THE APPLICATION OF A BLUNT FORCE

(76) Inventor: Michael Bishop, 64-19 65th St., Middle Village, NY (US) 11379

( * ) Notice: Subject to any disclaimer, the term of this patent is extended or adjusted under 35 U.S.C. 154(b) by 574 days.

(21) Appl. No.: 11/606,698

(22) Filed: Nov. 30, 2006

(51) Int. Cl.
*G09B 19/00* (2006.01)

(52) U.S. Cl. .................................................. 434/226

(58) Field of Classification Search ............... 434/219, 434/226, 247; 292/163, 219, 240, 241, 261; 52/204.1, 213
See application file for complete search history.

(56) References Cited

U.S. PATENT DOCUMENTS

| | | | |
|---|---|---|---|
| 5,752,835 A | * | 5/1998 | Whitmer, Sr. ............... 434/226 |
| 5,906,493 A | * | 5/1999 | Bishop ........................ 434/226 |
| 6,179,620 B1 | * | 1/2001 | Schmid ....................... 434/226 |
| 6,877,988 B2 | * | 4/2005 | Phillips et al. ............... 434/226 |
| 7,074,043 B1 | * | 7/2006 | Jacobson ..................... 434/226 |
| 2005/0050816 A1 | * | 3/2005 | Manning et al. .............. 52/213 |
| 2006/0240391 A1 | * | 10/2006 | Sovine et al. ................ 434/219 |

* cited by examiner

*Primary Examiner*—Kurt Fernstrom
(74) *Attorney, Agent, or Firm*—Goldstein Law Offices, P.C.

(57) ABSTRACT

A training device, for training emergency personnel to breach a locked door with a blunt force technique. The training device includes a door, a door frame, and a locking mechanism having a latching cylinder with a vertical axis, a latch stop, and at least one heavy-duty spring. The door is held in a closed position by the latching cylinder engaging the latch stop under the strong bias of the spring. The application of a blunt force near the locking mechanism causes the latching cylinder to move slightly away from the latch stop to allow the door to enter an open position.

10 Claims, 3 Drawing Sheets

TRAINING DEVICE FOR SIMULATING THE RESPONSE OF A LOCKED DOOR TO THE APPLICATION OF A BLUNT FORCE

BACKGROUND OF THE INVENTION

The invention relates to a training device for firefighters and law enforcement personnel. More particularly, the invention relates to a training device that simulates the response of a locked door to a blunt force and thereby allows such personnel to be trained to effectively breach a locked door in various manners employing the application of blunt force.

Dealing with emergency situations of all kinds often requires that emergency personnel can quickly gain access through a locked door. Clearly, door locks are designed to withstand unauthorized access. Many techniques have been developed, however, that can quickly defeat even the most well designed locks. It is important that emergency personnel are well trained in all such techniques, so that they can be carried out quickly and efficiently in the field when necessary.

One problem with training personnel to break down doors is reconciling the fact that training requires significant repetition to become part of the trainee's muscle memory, and that doing so effectively would ordinarily produce a lot of broken doors! My prior U.S. Pat. No. 5,906,493 described a device that has helped train countless emergency personnel to pry a lock using a "haligan tool" and axe or maul, to spread a door from the door jamb, with a non-destructive, reusable training device. While these units may be suitable for the particular purpose employed, or for general use, they would not be as suitable for the purposes of the present invention as disclosed hereafter.

Beyond acting directly at the door edge to prying a lock open by spreading the space between the door and jamb, several other techniques are available to defeat a lock. Sometimes, such as when a plate is mounted in front of the lock, such prying techniques are ineffective. Accordingly, Knowing several different techniques for breaching a door allows a quick substitution when one technique does not work in the field. Many such techniques employ blunt force—the use of a battering ram, and a shotgun blast to name a few. Thus, there is a need for a training device that responds just like a conventional locked door to the application of a blunt force.

SUMMARY OF THE INVENTION

It is an object of the invention to produce a training device that facilitates training of emergency personnel to breach a locked door. Accordingly, the present invention effectively simulates the response of a locked door to a blunt force.

It is another object of the invention to provide a training device that allows emergency personnel to repeatedly practice breaching the door. Accordingly, the training device of the present invention is non-destructive, so that is can be reused many times to allow for maximum training.

It is another object of the invention to provide a training device that closely simulates the force required to breach a door using blunt force. Accordingly the present invention employs a spring mechanism that cannot be overcome by ordinary manual force without the aid of tools, and requires the application of extraordinary force before it will allow the "door" to open.

The invention is a training device, for training emergency personnel to breach a locked door with a blunt force technique. The training device includes a door, a door frame, and a locking mechanism having a latching cylinder with a vertical axis, a latch stop, and at least one heavy-duty spring. The door is held in a closed position by the latching cylinder engaging the latch stop under the strong bias of the spring. The application of a blunt force near the locking mechanism causes the latching cylinder to move slightly away from the latch stop to allow the door to enter an open position.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
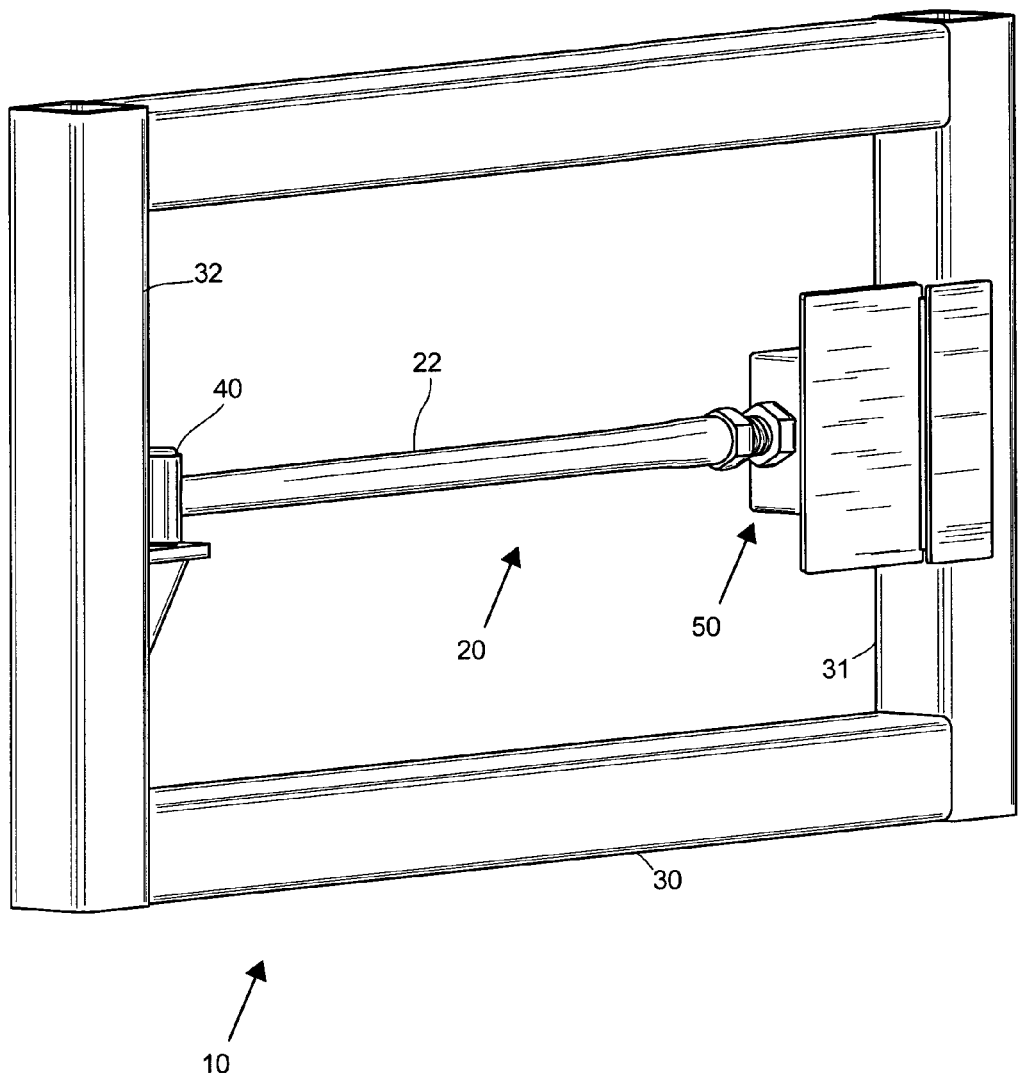
FIG. 1 is a diagrammatic perspective view, illustrating the training device in the closed position.

FIG. 1 illustrates the training device 10, having a simulated door 20 and a simulated door frame 30. The simulated door frame 30 has a first vertical member 31 and a second vertical member 32. The door 20 is attached to the door frame 30 with a hinge mechanism 40 at the second vertical member 32. Note that the simulated door 20 and door frame 30 can take many forms, while holding the functional requirement of having a closed position where the door 20 is engaged with the frame 30 and in a common plane therewith, and an open position where the door 20 is free to swing pivotally with respect to the door frame 30 from the hinge. In addition, the device 10 includes a locking mechanism 50 located at the first vertical member 32 that selectively holds the door 20 in the closed position, and selectively allows the door 30 to enter the open position.

Clearly in FIG. 1, in the embodiment illustrated, the relation of the door 20 to our common experience of a "door" is perhaps more metaphorical than actual. In fact numerous configurations can be presented, because the purpose is truly to simulate the response of the lock assembly of a locked door to a blunt force applied to the door near the lock.

Figure 4:
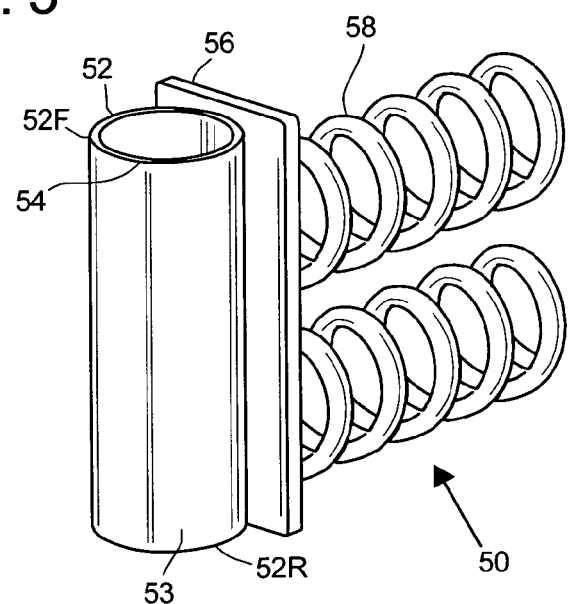
FIG. 4 is a diagrammatic perspective view, illustrating just the latching cylinder, springs, and guide plate.

To facilitate the effective simulation of the behavior of a locked door to a blunt force, the locking mechanism 50 is illustrated in FIG. 4. In particular, the locking mechanism includes a latching cylinder 52 that is cylindrical in shape and extends vertically—having a vertical axis that extends substantially parallel to the first vertical member 31 of the door frame 32—and has an outside surface 53, a front 52F and a rear 52R. The latching cylinder 52 has a convex curve 54 between the front and back. The latching cylinder 52 is secured to a guide plate 56 and attached to at least one heavy-duty spring 58. The heavy-duty springs 58 are sufficiently stiff that a person having ordinary strength could not manually overcome their spring force to move the matching cylinder 52.

Figure 3:
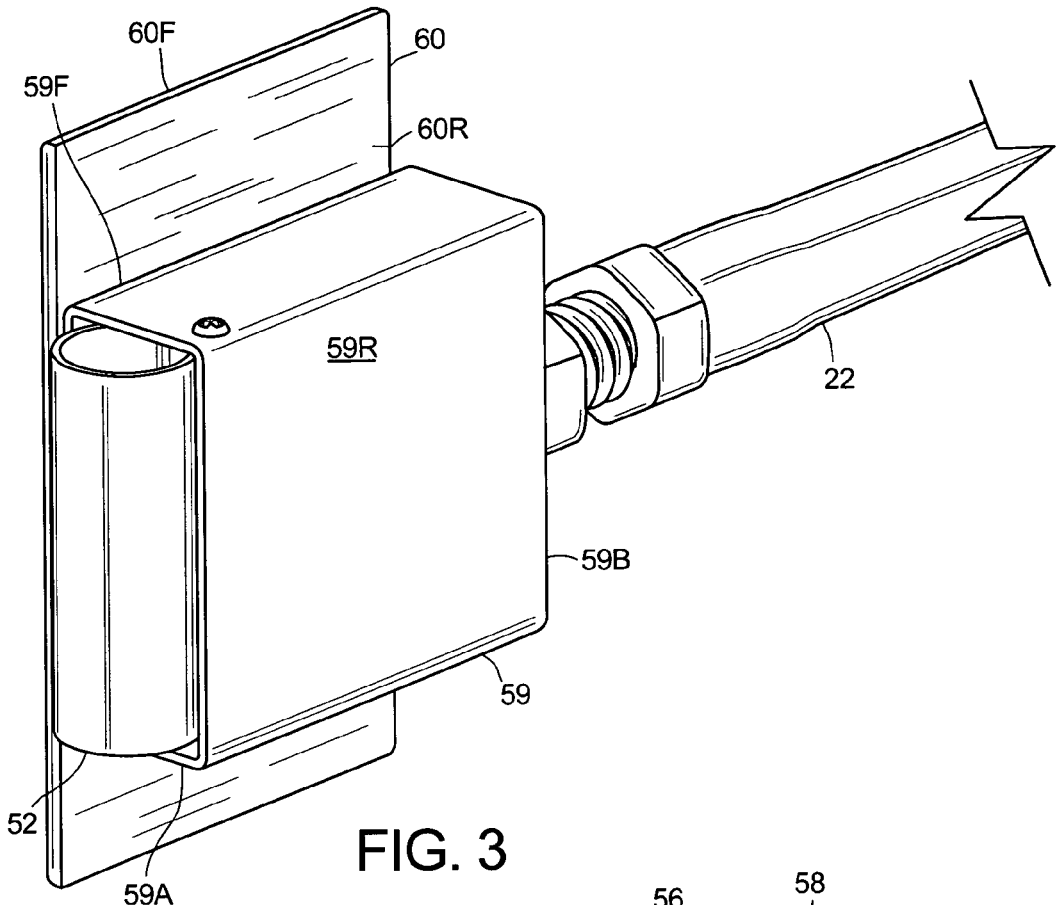
FIG. 3 is a diagrammatic perspective view, illustrating a portion of the locking mechanism, in association with the receiving plate, and arm.

Referring now to FIG. 3, the locking mechanism includes a housing 59 that is substantially the shape of a rectangular prism, has a front 59F and rear 59R, and has an outer side 59A that is open and an inner 59B that is closed. The latching cylinder 52 protrudes partially from the outer side 59A and the guide plate and springs 58 extend inside the housing 59 such that the springs 58 extend against the inner side 59B. Accordingly, when pressure is exerted inwardly against the latching cylinder 52, motion due to such pressure is resisted by the springs 58.

Also seen in FIG. 3 is a door arm 22. Better seen in FIG. 1, the door arm 22 connects the locking mechanism 50 to the hinge mechanism 40 to simulate the pivotal movement of an ordinary door when the locking mechanism is opened.

Further seen in FIG. 3, a receiving plate 60 is mounted to the front 59F of the housing 59. The receiving plate 60 has a front 60F and a rear 60R. The rear 60R is secured to the housing 59. The front 60F of the receiving plate 60 is a recipient surface for blunt force being applied against the locking mechanism 50. The housing 59 itself can serve as the receiving plate. A separate metal plate is preferred however, as it will significantly enhance durability of the training device 10 through repeated use. In the embodiment illustrated, the receiving plate 60 extends significantly above and below the housing 59 and thus is likely to receive any direct hits during a training exercise. Accordingly, the receiving plate 60 is preferably a durable steel plate.

Figure 2:
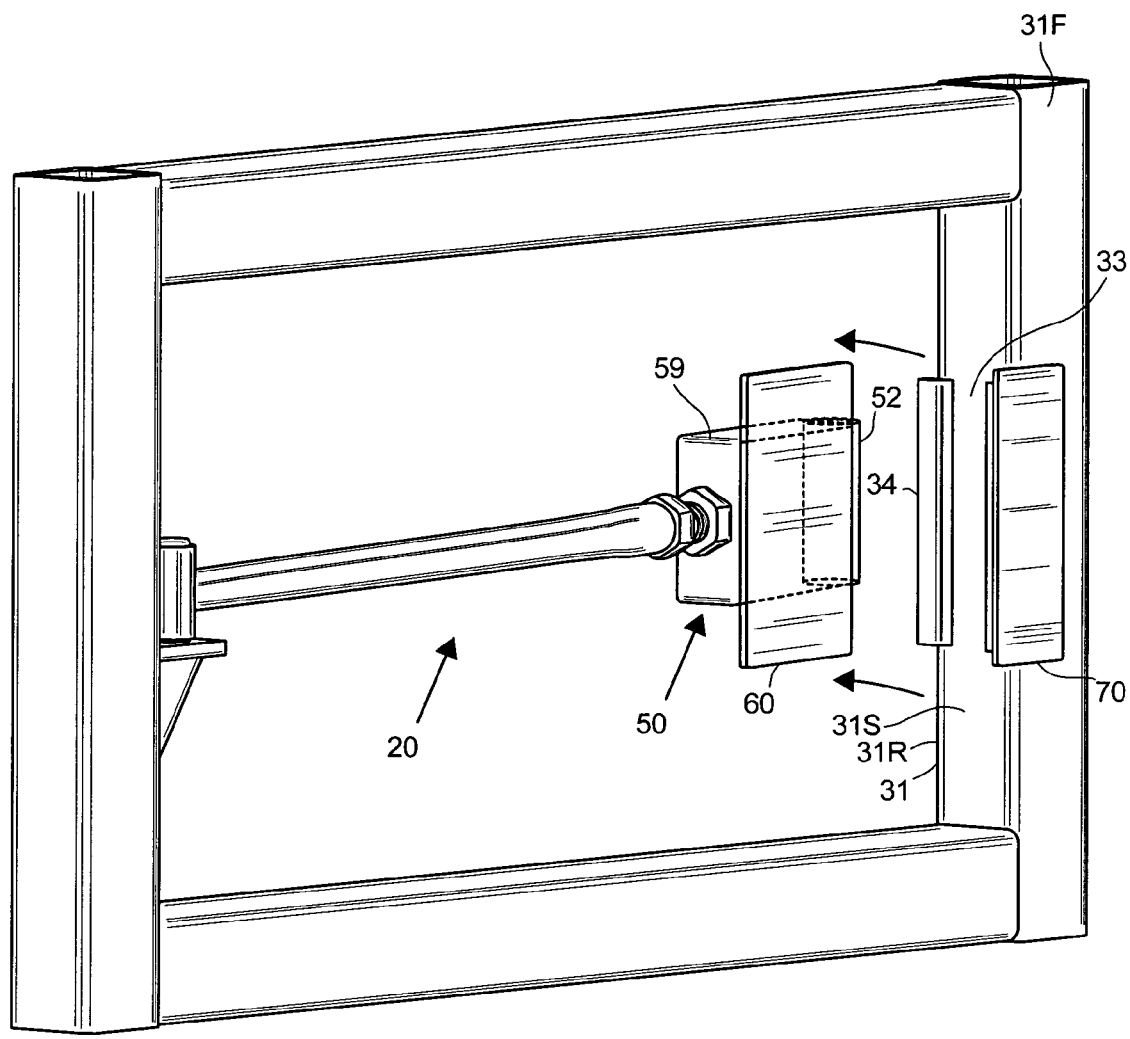
FIG. 2 is a diagrammatic perspective view, illustrating the training device in the open position.

Referring now to FIG. 2, the first vertical member 31 that has a front 31F, a rear 31R, and an inner surface 31S. A latch keep 33 is defined as an area adjacent to a latch stop 34 mounted on the inner surface 31S near the rear 31R. When the door is in the closed position illustrated in FIG. 1, the latching cylinder 52 protruding from the housing 59 is seated snugly within the latch keep 33 and is prevented from moving toward the rear 31R by the latch stop 34.

Accordingly, it is the combination of the latching cylinder 52 and latch stop 34 that prevent the door from swinging rearwardly and thus hold the door 20 in the closed position.

A guard plate 70 is mounted to the front 31F of the first vertical member 31 of the door frame and protrudes slightly beyond the inner surface 31S. When the door 20 is in the closed position, the first guard plate 70 both engages the receiving plate 60 and prevents movement of the door 20 toward the front 31F and prevents access to the locking mechanism 50, and most notably the latching cylinder 52 by any tool. Accordingly, the guard plate 70 effectively eliminates the possibility of the use of a prying technique to open the door 20, and thus necessitates the use of a blunt force technique that the training device 10 is intended for.

It should be clear that in light of the positioning of the guard plate 70, it is not necessary to have another latch stop 34 toward the front 31R. In particular, forward motion of the door 20 is prevented by the receiving plate 70 (or housing 59) striking the guard plate 70. The latch keep 33 could thereby be defined as an area on the inner surface 31S of the first vertical member 31 between the latch stop 34 near the rear 31R and the guard plate 70.

With the structure of the training device 10 having been sufficiently defined, the operation of the device 10 and its use in training personnel to breach a door with a blunt force technique, will be now be described in detail.

In particular, with the latching cylinder 52 seated within the latch keep 33, the only way to open the door 20 is to move the latching cylinder 52 inwardly within the housing 59 sufficiently so that the curved outside surface 53 clears the latch stop 34 near the rear 31R of the first vertical member 31. The geometry would seem to suggest that one could urge the latching cylinder 52 inwardly by the pushing against the door 20 and thus 'rolling' the cylinder inwardly by translating the rearward force on the door into an inward motion by the cylinder 52 due to the curved outer surface 53. The use of springs 58 that exert a substantial spring force, however, mean that this is how the locking mechanism is opened in principle, but the latching cylinder will not move and the door will not open by pushing upon the receiving plate 60 with ordinary force.

Accordingly, it is clear that what is needed to open the door 20 is indeed a push in the rearward direction, but must be an extremely strong force exerted against the front 60F of the receiving plate 60. Accordingly, the door 20 can be successful opened by the skillful application of blunt force against the receiving plate 60. In particular, the use of a battering ram against the receiving plate 60 can successfully overcome the spring force exerted by the springs 58 and cause the latching cylinder 52 to move inwardly enough so that it clears the latch stop 34 and the door opens. In addition, a shotgun blast, striking the receiving plate 60 will provide sufficient force to open the door 32. Obviously, all components of the training device 10 are made of heavy duty metals that will endure such tortuous wear from items such as battering rams and shotguns.

Once the door 20 has been opened, the training device 10 must be restored to the closed position for reuse. In order to once again close the door, blunt force must be applied against the rear 59R of the housing to cause the latching cylinder 52 to clear the latch stop 34 and move into the latch keep.

In conclusion, herein is presented a training device that effectively simulates the response of a locked door to the application of a blunt force near the lock. The training device can be used repeatedly to train emergency personnel the proper techniques for breaching a locked door. The invention is illustrated by example in the drawing figures, and throughout the written description. It should be understood that numerous variations are possible, while adhering to the inventive concept. Such variations are contemplated as being a part of the present invention.

What is claimed is:

1. A training device, for training emergency personnel to breach a locked door with a blunt force technique, comprising:

a door having a front and a rear;

a door frame having a first vertical member and a second vertical member, the door hingably attached to the second vertical member, the first vertical member having a latch stop that prevents the door from swinging rearwardly and a latch keep adjacent to the latch stop;

a locking mechanism, selectively securing the door and door frame at the first vertical member in the closed position, the locking mechanism having a latching cylinder that is cylindrical in shape with a vertical axis extending substantially parallel to the first vertical member of the door frame, and at least one spring that urges the latching cylinder outwardly against the latch keep to hold the door in a closed position, the spring having sufficient strength such that upon the exercise of an extraordinary blunt force against the door through the exercise of the blunt force technique against the locking mechanism, the latching cylinder is allowed to move sufficiently inwardly to clear the latch stop and allow the door to swing open rearwardly.

2. The training device as recited in claim 1, wherein the locking mechanism has a housing that contains the spring, the housing having a front, a rear, and an outer side, the latching cylinder protrudes slightly from the outer side of the housing.

3. The training device as recited in claim 2, wherein a receiving plate is mounted to the front of the housing, the receiving plate for receiving the blunt force from the blunt force technique.

4. The training device as recited in claim 3, wherein the first vertical member has a front, a rear, and an inner surface, the latch keep is on the inner surface of the first vertical member; and further comprising a guide plate mounted to the front of the first vertical member of the door frame adjacent to the locking mechanism protruding slightly past the inner surface, the guide plate preventing forward swinging motion of the door by preventing forward motion of the receiving plate, the guide plate also preventing a tool from accessing the latching cylinder from the front.

5. The training device as recited in claim 4, wherein the latching cylinder is secured to the spring with a guide plate, the guide plate helping to guide and steady motion of the latching cylinder within the housing.

6. A training device, for training emergency personnel to breach a locked door with a blunt force technique, comprising:
   a door having a front and a rear;
   a door frame having a first vertical member and a second vertical member, the door hingably attached to the second vertical member, the first vertical member having a front, a rear, and an inner surface, the door having a closed position wherein the door is substantially coplanar with the door frame, and an open position, the inner surface of the first vertical member having a latch stop that prevents the door from swinging rearwardly and a latch keep adjacent to the latch stop;
   a locking mechanism, selectively securing the door and door frame at the first vertical member in the closed position, the locking mechanism having a latching cylinder that is cylindrical in shape with a vertical axis extending substantially parallel to the first vertical member of the door frame and a convex outward curve that extends toward the first vertical member, and at least one spring that urges the latching cylinder outwardly against the latch keep to hold the door in a closed position, the spring having sufficient strength such that upon the exercise of an extraordinary blunt force against the door through the exercise of the blunt force technique against the locking mechanism, the latching cylinder is allowed to move sufficiently inwardly to clear the latch stop and allow the door to swing rearwardly to the open position.

7. The training device as recited in claim 6, further comprising a guard plate mounted to the front of the first vertical member, the guard plate extending inwardly past the inner surface for preventing the door from swinging forwardly and preventing access to the latching cylinder by a prying tool.

8. The training device as recited in claim 7, wherein the locking mechanism has a housing that contains the spring, the housing has a front an outer side and an inner side, the latching cylinder protrudes from the outer side, the spring is biased against the inner side of the of the housing.

9. The training device as recited in claim 8, housing is substantially rectangular prism shaped, and wherein the spring is attached to the latching cylinder with a guide plate that moves within the housing and steadies motion of the latching cylinder.

10. The training device as recited in claim 9, further comprising a receiving plate, mounted to the front of the housing.

\* \* \* \* \*